R. A. PARKE.
LIGHT AND LOAD BRAKE APPARATUS.
APPLICATION FILED SEPT. 2, 1909.
1,025,297.
Patented May 7, 1912.
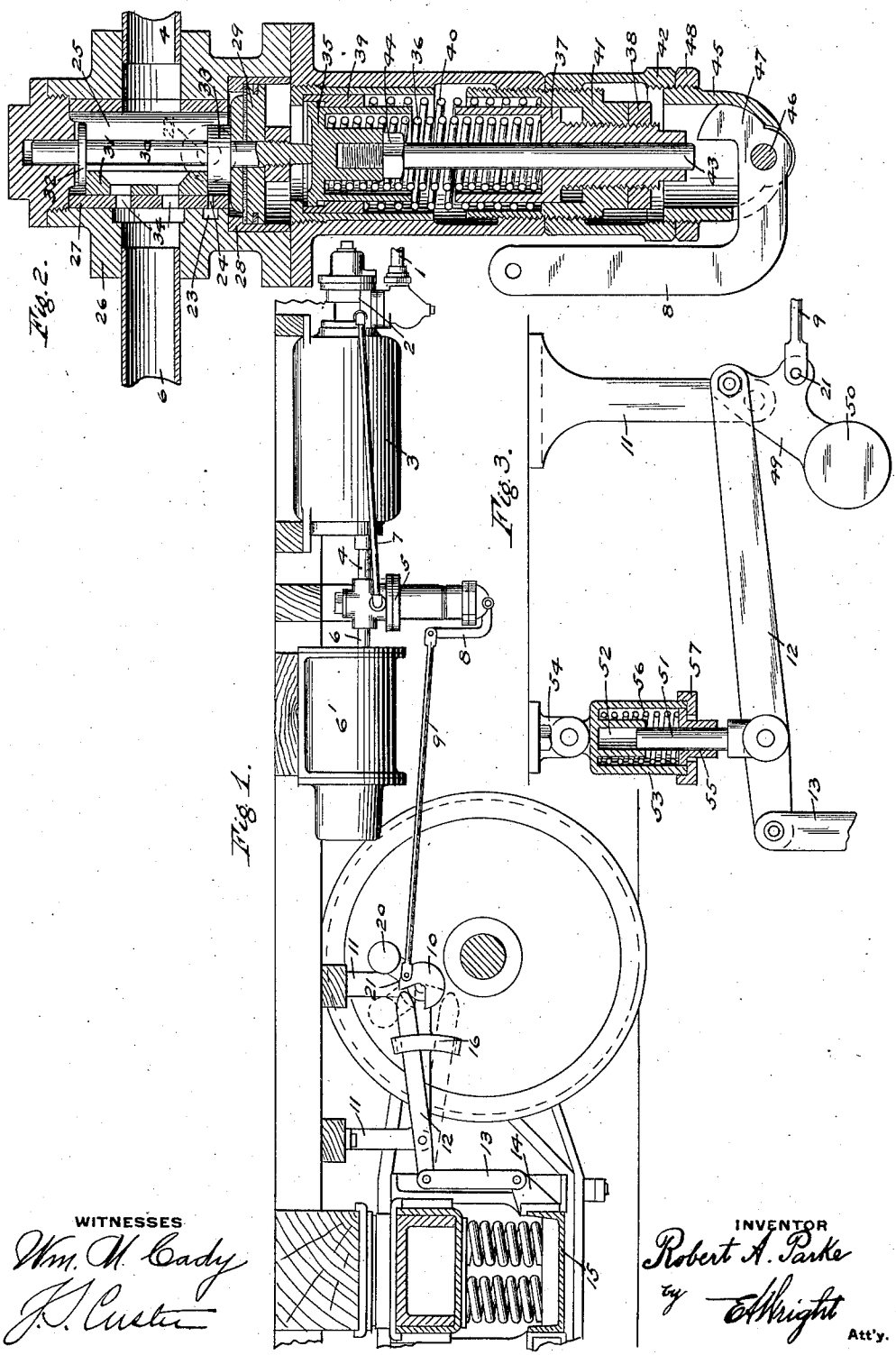

UNITED STATES PATENT OFFICE.

ROBERT A. PARKE, OF PARKE MINES, ONTARIO, CANADA, ASSIGNOR TO THE WESTING-HOUSE AIR BRAKE COMPANY, OF PITTSBURGH, PENNSYLVANIA, A CORPORATION OF PENNSYLVANIA.

LIGHT AND LOAD BRAKE APPARATUS.

1,025,297.  Specification of Letters Patent.  Patented May 7, 1912.

Application filed September 2, 1909. Serial No. 515,896.

*To all whom it may concern:*

Be it known that I, ROBERT A. PARKE, a citizen of the United States, residing at Parke Mines, in the district of Nipissing, Province of Ontario, Dominion of Canada, have invented new and useful Improvements in Light and Load Brake Apparatus, of which the following is a specification.

This invention relates to light and load brake apparatus and has for its object to provide improved means for effecting a different and greater retarding friction of the brakes upon the car wheels, more particularly of freight cars, when the cars are loaded than when they are not loaded. When the cars are loaded, the momentum of the added weight has also to be stopped by the air brakes, and the distance in which the train can be stopped increases directly in proportion with the increased total weight of the train. The recent practice of building cars of very high carrying capacity has increased the relative weight of the train, when loaded, to such an extent that the stopping distance is from four to five times as great as when the train is not loaded, and it has become very important to provide an increased stopping capacity of the brakes of loaded freight trains, not only for reasonable protection against accident to themselves and other trains, but also for the satisfactory operation of such trains in ordinary service.

To accomplish this purpose, my invention consists in the combination of certain novel devices, hereinafter set forth, whereby the air pressure in the brake cylinder upon each car shall be so controlled that, as at present, it shall have a moderate limit in all service application of the brakes, and be increased to the proper limit in emergency applications, when the car is not loaded, and it shall have a similar difference of service and emergency application limits, of much greater degree, when the car contains more than a certain fixed load.

It includes the use of a novel form of pressure regulating valve, introduced in the freight car apparatus of the ordinary quick action air brake between the auxiliary reservoir and the brake cylinder, whereby the proper pressures are provided through the aid of a pawl or latch which is operated by means of a simple mechanism attached to the car body and so connected to one of the trucks that it is actuated by the downward movement of the car body, in the yielding of the springs, when the car is loaded. When the load exceeds a fixed amount the mechanism is thus actuated to move the pawl in the pressure regulating valve, by which the higher service and emergency brake cylinder pressure become available.

This device is wholly different from those which seek to regulate the force of the brakes according to the load. It is well known that the springs in the trucks which are adapted to the intended loading of the car, gradually settle downward through the vertical distance allowed for the purpose, as the car is loaded. This downward movement is proportional to the load placed in the car, until the entire load completes it. It has been proposed to utilize this condition, through various devices and means, to cause the force with which the brakes are applied to the car, to vary in proportion to the load upon the springs. Means have been employed to cause the force of application to vary between fixed limits by the immediate influence of the depression of the springs by the load. Others have provided for indirectly utilizing the principle through introducing into the brake system upon the car a lever adapted to lift the car body from the center plate, the resulting movement of which expanded the air in the brake cylinder and so limited the air pressure. In each case it is the purpose to provide a variable resisting power of the brakes, which is to be measured by the weight of the load in the car. My purpose, on the contrary, is to provide the usual braking resistance for the unloaded car and, in addition, a certain greater braking resistance, to be used only when the load in the car exceeds a corresponding weight; and the vertical movement of the car body, resulting from deflection of the springs by the load, automatically operates to both determine the proper load and actuate the mechanism which provides the corresponding air pressures in the brake cylinder.

In the accompanying drawing, which illustrates one form of apparatus embodying my invention, Figure 1 is a sectional view of a portion of the underframing and a truck of a freight car with the air brake apparatus shown in side elevation; Fig. 2 is a longitudinal sectional view of the improved pressure controlling valve; and Fig. 3 is a modified form of the apparatus for actuating the operation of the pressure controlling valve.

In Fig. 1 is shown the apparatus of a form of the ordinary quick action freight car brake, including branch pipe 1 leading from the train pipe to the triple valve 2, which is secured directly to the auxiliary reservoir 3. Pipe 4 ordinarily leads directly from the triple valve (through the auxiliary reservoir) to the brake cylinder, but with my invention it leads to pressure controlling valve 5, from which pipe 6 leads to the brake cylinder 6' which in this form of the brake apparatus is located directly back of the auxiliary reservoir 3. In addition to the ordinary apparatus pipe 7 leads from the triple valve to the pressure controlling valve 5. Extending outward and upward from the pressure controlling valve 5 the lever 8 is pinned at its upper end to connecting rod 9, the other end of which is connected to the disk 10, supported from the car body by frame 11 in such a manner that disk 10 is free to rotate upon a central pin extending through frame 11. Upon an arm extending radially outwardly from disk 10 in the direction of connecting pin 21 from the center of the disk is a weight 20, and the rotation of disk 10 is limited, through the pinned connection of the rod 9, by the movement of the upper end of the lever 8 of the pressure controlling valve. The radial direction of the pin 21 and weight 20 is such that the weight 20 is about equally distant from the vertical line through the center of rotation of the disk when the lever 8 is at opposite ends of its movement. Similarly secured by a cylindrical pin at the other end of frame 11 is a lever 12, one end of which is secured by a pin to the connection 13, which is also secured by pin to the bracket 14, which is bolted to the channel 15, which forms the spring plank of the truck. The other end of lever 12 moves freely in the guides 16, formed integrally with frame 11, the extreme end being rounded to a small semicircle, and for a distance from the end, equal to the radius of disk 10, the edges have curved faces to engage the cam-like faces of the disk 10 with which they come into contact. The disk 10 is directly in the path of the end of lever 12, the center of the disk lying just beyond the circular path of the end of the lever, and the disk is cut away and the edges of the remaining portion are formed in such a manner that the lever does not come into contact with the disk until just before it reaches the horizontal position, and just after passing the horizontal position the disk has been moved so that the position of the weight 20 operates to continue and complete the movement by gravity, practically independently of lever 12, to the opposite position indicated in dotted lines.

Whatever the load designed to be carried, the springs are so proportioned that only about one and one-half inches depression results from the load. To nicely determine the load which has been selected as the loaded weight for increased braking efficiency, whether all or whatever portion of the full weight of the load, and to assure the operation of the increased brake cylinder pressures with a load variation within reasonable limits, where the car is partially loaded, the operative movement of the spring depression is multiplied by the use of the lever 12, which, being as one to four, has a total movement of about 6 inches at the end operating the disk. It is then placed in such a position, in securing frame 11 to the car frame, that the road selected for increased braking power shall bring the lever into a horizontal position. The edges, acting as cams, of the disk illustrating my invention, are straight, terminating at the center with a circular curve of the same radius as that of the semicircular end of the lever, and the slight circular curvature of the edges of the lever where they must meet the straight edges of the disk result in the maximum leverage upon the disk at the beginning of the movement when the resistance of the weight is the greatest, and in the minimum resistance to the movement of the disk when its movement is the most rapid, at the time when the lever operates with the least advantage. Thus, as the weight of the disk is slight and the work of the operation is trifling, the friction and wear are minimized and are very small.

While the operation of loading and unloading a car is comparatively infrequent, so that the wear upon such an apparatus from operation is small, the constant vibration of an apparatus, moving with every deflection of the springs of a car in service, becomes a very different consideration. It is the freedom of the disk and all the parts connected with it from further influence by lever 12, after it has once been operatively moved into position, that comprises one of the advantageous features of the apparatus. The depression of the springs by the load promptly and effectively introduces the higher brake cylinder pressures, under the proper conditions, and vice versa, while the wear and disorder of the apparatus that must result from the constant vibration that must accompany the continued influence of the spring action, are wholly avoided.

In the operation of the air pressures the air from the auxiliary reservoir is conducted to the brake cylinder in all service applications of the brakes through pipe 7, which enters the pressure controlling valve through the connection 22, shown in dotted lines in Fig. 2, and thence through the annular passage 23 and port 24 into the valve chamber 25.

In my application, Serial No. 515,895, filed Sept. 2, 1909, for improvement in high speed brake apparatus, I have fully described the construction of the triple valve by which the auxiliary reservoir air pressure can have access to the brake cylinder by no other means, except in emergency applications of the brakes. The same construction may also be employed in the triple valve of the apparatus used in the practice of my present invention.

The pressure controlling valve, as shown in Fig. 2, consists of a casing, in four sections, the upper one of which 26 contains bushings 27 and 28. In the latter, piston 29 is secured to stem 30 and operates slide valve 31 which is located between the collars 32 and 33 upon stem 30. Beside port 24, slide valve 31 also controls the double port 34 in bushing 27, the port 34 being divided, and the slide valve 31 being provided with two corresponding openings to reduce the valve travel otherwise necessary. In emergency applications of the brakes the air from both the train pipe and auxiliary reservoir enters valve chamber 25 through pipe 4, and in all cases the air passes through ports 34 and pipe 6 to enter the brake cylinder. The lower end of piston stem 30 rests upon the cylindrical abutment 35, which is supported by spring 36, the latter being adjusted and held in place by adjusting screw 37 which is then secured by nut 38. Abutment 35 is free to move downward in the cylindrical ring 39, which incloses and guides it until the flange at the upper end of abutment 35 meets the shoulder produced by the bottom of the annular recess in the upper end of ring 39 provided for the free movement of the flange. Ring 39 is supported by spring 40, which is adjusted and held in position by the adjusting nut 41, which is in turn locked by the third section of the casing 42. A rod 43 extends loosely through adjusting screw 37 and is secured to abutment 35 by screwing into the central boss which extends downward through the interior of spring 36 and is locked in place by lock nut 44. The fourth section 45 of the casing incloses the lower end of the device by screwing into section 42 and is locked in place by lock nut 48. The lower end of lever 8 passes through a slot in cap 45, to which it is secured by pin 46. The lever terminates in a pawl or latch 47 having a cylindrical face concentric with pin 46. When springs 36 and 40 have been adjusted the adjustment of rod 43 and cap 45 are such that the outward movement of lever 8 brings pawl 47 immediately below the lower end of rod 43, so that no downward movement of the rod or of the abutment 35 can take place, and thereby locks the valve mechanism in its normal open position.

The operation of the apparatus is as follows: When the car is not loaded the position of the disk 10 and of lever 8 remains as shown in the drawings, and abutment 35 is free to be moved downward by piston 29 when the air pressure upon it exceeds the resistance of spring 36. In service applications of the brakes the air from the auxiliary reservoir passes to the brake cylinder by the pipe 7 and enters the pressure controlling valve through port 24, from which it passes through ports 34 and pipe 6 to the brake cylinder. Spring 36 is so adjusted that when the prescribed limit of brake cylinder pressure for service applications upon unloaded cars is reached, that pressure moves piston 29 downward, causing slide valve 31 to close port 24 and thereby prevent any greater pressure in the brake cylinder. The piston moves downward until the flange of abutment 35 is arrested by the shoulder of ring 39 where the resistance of spring 40 also opposes further movement of the piston. In emergency application of the brakes the brake cylinder pressure is about 20 per cent. greater than in service applications, and spring 40 is so adjusted that the combined resistance of springs 36 and 40 requires about 20 per cent. greater air pressure upon the piston 29 to move the valve 31 down to close the ports 34 than is required to close port 24. Therefore when an emergency application is made the air under pressure, which then flows from the triple valve directly through port or pipe 4 to the chamber 25, accumulates upon the piston 29 to a degree sufficient to move the same downward to compress both springs 36 and 40 and close the ports 34 to cut off further supply to the brake cylinder.

When the car is loaded the disk 10 is moved into the position shown in dotted lines Fig. 1, and lever 8 is moved outward so that pawl 47 prevents any movement of piston 29 of valve 31. In this condition the air passes through the controlling valve without being influenced, and the full brake cylinder pressure in service applications will be that of equalization with the pressure of expanded auxiliary reservoir air. In the emergency application the brake cylinder pressure will of course exceed that of full service application by the added pressure of air received directly from the train pipe. The pressure controlling valve thus becomes actively operative only when the car is unloaded, and it is then operative in limiting the brake cylinder pressure in both service and emergency applications of the brakes. In emergency applications it is important that an unobstructed passage of comparatively large area shall lead from the triple valve to the brake cylinder, for rapid release of the train pipe air is essential to the quick serial action of the brakes through the train. Even by dividing port 34, and thereby reducing the required valve travel, the necessary area of port 34 still requires a comparatively long movement of the valve to close it. A short movement closes port 29, and a pressure about 20 per cent. greater must occur before port 34 is closed, while it is essential that port 34 shall remain fully open until it closes, and not gradually close, as the pressure increases. No single spring could provide the necessary resistances for the required operation without difficult or undesirable construction and much useless valve movement. By the use of two springs each contains the least actual weight of material required for strength, the operations are distinct, prompt and characterized by the minimum difference of air pressures in the valve travel of port closure. The valve movements are separate and distinct and nothing about either operates to prejudice or complicate the conditions or results of the other.

A modification of the apparatus that actuates the operation of the pressure controlling valve is shown in Fig. 3. The lever 12 is connected to the spring plank of the truck by the connection 13, as in Fig. 1, but instead of being fulcrumed by pin to frame 11 it is pinned to a plunger rod 51 which works vertically in the central cavity 52 of cylinder 53, which is connected by pin at its upper end to the bracket 54 by which it is secured to the car frame. Rod 51 also works through a spring abutment 55, at the lower end of the cylinder 53, which is secured in the cylinder, against the pressure of spring 56, by the screw cap 57. Rod 51 moves in pocket 52 through the whole movement of the deflection of the truck springs, but when the deflection corresponds with the weight of load chosen for loaded car braking, a shoulder on rod 51 engages abutment 55, and further upward movement of the rod is accompanied by the abutment with corresponding compression of the spring 56. The other end of lever 12 is pinned to lever 49, which is secured by a pin connection to frame 11 in a similar manner to that of disk 10 in Fig. 1. Rod 9 is secured to lever 49 by pin 21, and the lower end of lever 49 is provided with a weight 50. When the car is not loaded weight 50 holds lever 49, with its attached parts, in the position shown in Fig. 3, and lever 8 of the pressure controlling valve is in the position shown in Fig. 1, so that the brake cylinder pressures are confined to the inferior limits of the unloaded car. When the car is loaded the consequent depression of the springs causes the relative movement upward of rod 51 in cylinder 53 until the shoulder thereof engages abutment 55. Weight 50 is not sufficient to resist the tension of spring 56, and further movement of lever 12 rotates lever 49, thereby moving lever 8 and pawl 47 of the pressure controlling valve, so that all movement of piston 29 and valve 31 is cut off. Thereafter, continued depression of the car springs causes rod 51 to resume travel into cylinder 53, but accompanied by abutment 55 and corresponding compression of spring 56, maintaining lever 49 and connected parts in their acquired positions until removal of the load in the car allows abutment 55 to be returned to its seat by the spring 56, and lever 49 and connected parts to be then restored to their positions in Fig. 3 by weight 50.

Having now described my invention, what I claim as new and desire to secure by Letters Patent, is:—

1. In a light and load brake apparatus, the combination with a device for limiting the fluid pressure in the brake cylinder when the brakes are applied, of means controlled by the weight of the load for cutting said device into or out of operation.

2. In a light and load brake apparatus, the combination with a device for limiting the degree of fluid pressure in the brake cylinder when the brakes are applied, of a mechanism for cutting said device into or out of operation, and means operated by the weight of the load for actuating said mechanism to either position.

3. In a light and load brake apparatus, the combination with a device for limiting the degree of fluid pressure in the brake cylinder when the brakes are applied, of a mechanism for cutting said device into or out of operation, and means operated by the rise or fall of the car upon its springs for actuating said mechanism to its respective positions.

4. In a light and load brake apparatus, the combination with a device for limiting the pressure with which the brakes are applied, of a shifting weight for cutting said device into or out of operation, and means operated by the weight of the load for shifting said weight to one or the other position.

5. In a light and load brake apparatus, the combination with a valve device for normally limiting the pressure with which the brakes are applied in service applications, of means operated by the weight of the load for cutting said valve device into or out of effective operation.

6. In a light and load brake apparatus the combination with a valve device for limiting the braking pressure in service applications to a certain amount and in emergency applications to a predetermined different amount, of means for cutting said valve device into or out of operation.

7. In a light and load brake apparatus, the combination with a train pipe, auxiliary reservoir, triple valve and brake cylinder, of a controlling valve mechanism in the service port from the triple valve to the brake cylinder, and also in the emergency passage from the triple valve to the brake cylinder.

8. In a light and load brake apparatus, the combination with a train pipe, auxiliary reservoir, triple valve and brake cylinder, of a controlling valve mechanism in the service port from the triple valve to the brake cylinder, and also in the emergency passage from the triple valve to the brake cylinder, and means for cutting said mechanism into or out of operation.

9. In a light and load brake apparatus, the combination with a train pipe, auxiliary reservoir, triple valve and brake cylinder, of a pressure controlling valve mechanism having separate connections to the triple valve service port, the triple valve emergency port and the brake cylinder.

10. In a light and load brake apparatus, the combination with a train pipe, auxiliary reservoir, triple valve and brake cylinder, of a pressure controlling valve mechanism having separate connections to the triple valve service port, the triple valve emergency port and the brake cylinder, and means operated by different degrees of brake cylinder pressure for closing communication through the respective passages.

11. A controlling valve mechanism for brake cylinders, comprising a piston or abutment subject to brake cylinder pressure, a valve operated by said abutment for controlling communication from the triple valve service port and from the triple valve emergency port to the brake cylinder, a spring acting to oppose the movement of the piston and valve to close the service communication and a second spring acting to oppose further movement to close the emergency communication.

12. A controlling valve mechanism, comprising a piston subject to the opposing pressures of the brake cylinder and an adjustable spring for controlling communication from the triple valve service port to the brake cylinder, and a second spring acting on the piston when the service communication is closed to oppose the further movement of the same in controlling the communication from the triple valve emergency port to the brake cylinder.

13. A controlling valve device having ports adapted to communicate with the triple valve service port, the triple valve emergency port, and the brake cylinder, a piston subject to brake cylinder pressure, valve means actuated thereby for controlling said ports, a spring acting to oppose the preliminary movement of the valve, and a second spring acting to oppose the further movement thereof.

14. In a light and load brake apparatus, the combination of a controlling valve device communicating with the brake cylinder and with the triple valve service and emergency ports, and having a piston and valve for controlling said communication, a spring opposing the preliminary movement of the piston for governing the service communication, a second spring acting to oppose the further movement of the piston for governing the emergency communication, and means for locking said valve in its normal open position.

15. A controlling valve device having separate ports adapted to be connected to the triple valve service port and triple valve emergency passage respectively, and a piston and valve mechanism for controlling said ports and operated by one degree of brake cylinder pressure to close communication from the service passage to the brake cylinder, and by a higher degree of pressure to close communication from the emergency passage to the brake cylinder.

16. In a light and load brake apparatus, the combination with a device for limiting the pressure with which the brakes are applied, of means for cutting said device into or out of effective operation, and mechanism operated by the weight of the load for shifting said cutting out means at a certain point in its movement, but having free play upon both sides of said point whereby the device is unaffected by the usual oscillating vibration.

In testimony whereof I have hereunto set my hand.

ROBERT A. PARKE.

Witnesses:
J. S. DAVIS,
E. A. WRIGHT.

Copies of this patent may be obtained for five cents each, by addressing the "Commissioner of Patents, Washington, D. C."